(12) United States Patent
Sakkan et al.

(10) Patent No.: US 12,347,102 B2
(45) Date of Patent: Jul. 1, 2025

(54) METHOD AND SYSTEM FOR ASSESSING SOIL CARBON SEQUESTRATION OF A FARM BASED ON REMOTE SENSING

(71) Applicant: Tata Consultancy Services Limited, Mumbai (IN)

(72) Inventors: Mariappan Sakkan, Chennai (IN); Jayantrao Mohite, Thane (IN); Ravinkumar Sivalingam, Chennai (IN); Suryakant Ashok Sawant, Hyderabad (IN); Sanat Sarangi, Thane (IN); Srinivasu Pappula, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 549 days.

(21) Appl. No.: 17/661,949

(22) Filed: May 4, 2022

(65) Prior Publication Data

US 2023/0089304 A1    Mar. 23, 2023

(30) Foreign Application Priority Data

Sep. 3, 2021   (IN) .............................. 202121040117

(51) Int. Cl.
*G06T 7/00* (2017.01)
*A01B 79/02* (2006.01)
(Continued)

(52) U.S. Cl.
CPC ............ *G06T 7/0012* (2013.01); *A01B 79/02* (2013.01); *G06T 7/73* (2017.01); *G06V 20/13* (2022.01);
(Continued)

(58) Field of Classification Search
CPC ...... G06Q 50/02; G06V 20/188; G06V 20/13; G06V 20/10; A01B 79/005; Y02P 60/20; Y02P 60/30
See application file for complete search history.

(56) References Cited

U.S. PATENT DOCUMENTS

| 2010/0198736 | A1* | 8/2010 | Marino | G01N 33/0004 |
| | | | | 705/308 |
| 2012/0089304 | A1* | 4/2012 | Hamilton | G06Q 99/00 |
| | | | | 701/50 |
| 2022/0138649 | A1* | 5/2022 | Ashtekar | A01B 69/001 |
| | | | | 705/7.36 |

OTHER PUBLICATIONS

Agniva Mandal et al., "Impact of agricultural management practices on soil carbon sequestration and its monitoring through simulation models and remote sensing techniques: A review," Critical Reviews in Environmental Science and Technology, Date: Aug. 2020, vol. 52, Issue: 1, pp. 1-49, Tandf Online, https:/www.researchgate.net/publication/343917059_impact_of_agricultural_management_practices_on_soil_carbon_sequestration_and_its_monitoring_through_simulation_models_and_remote_sensing_techniqes_A_review/link/5ff1e4b045851553a015de07/download.

(Continued)

*Primary Examiner* — Raphael Schwartz
(74) *Attorney, Agent, or Firm* — Finnegan, Henderson, Farabow, Garrett & Dunner, LLP

(57) ABSTRACT

This disclosure relates generally to assessing soil carbon sequestration. One of the driving factors for climate change and global warming is emission of greenhouse gas emissions. Of the possible ways to reduce climate change and global warming adoption, sustainable agricultural practices will enable efficient soil carbon sequestration thereby reducing the greenhouse gases as well as increasing the crop yield. The disclosure is a method and a system for real time assessing soil carbon sequestration of farm based on remote sensing. The soil carbon sequestration of farm is assessed by (Continued)

continuously monitoring the farm at real time based on remote sensing using a plurality of satellite data and a plurality of farming data using several techniques. The several techniques utilized for assessing soil carbon sequestration includes machine learning, a carbon sequestration estimation technique, estimating a crop health index and an adoption index and computing a set of carbon sequestration parameters.

14 Claims, 4 Drawing Sheets

(51) Int. Cl.
- *G06T 7/73* (2017.01)
- *G06V 20/00* (2022.01)
- *G06V 20/10* (2022.01)
- *G06V 20/13* (2022.01)

(52) U.S. Cl.
CPC ............ *G06V 20/188* (2022.01); *G06V 20/38* (2022.01); *G06T 2207/30004* (2013.01); *G06T 2207/30188* (2013.01)

(56) References Cited

OTHER PUBLICATIONS

Santanu Mallik et al., "Mapping and prediction of soil organic carbon by an advanced geostatistical technique using remote sensing and terrain data," Geocarto International, Sep. 2020, Research Gate https://www.researchgate.net/publication/344169029_Full_article_Mapping_and_prediction_of_soil_organic_carbon_by_an_advanced_geostatistical_technique_using_remote_sensing_and_terrain_data/link/516d3841458515b7cf4c4b98/download.

Keith Paustian et al., "Quantifying carbon for agricultural soil management: from the current status toward a global soil information system," Carbon Management, Sep. 2019, vol. 10, Issue: 6, pp. 567-587, Tandf Online, https://www.tandfonline.com/doi/epub/10.1080/17583004.2019.1633231?needAccess=true.

* cited by examiner

METHOD AND SYSTEM FOR ASSESSING SOIL CARBON SEQUESTRATION OF A FARM BASED ON REMOTE SENSING

PRIORITY CLAIM

This U.S. patent application claims priority under 35 U.S.C. § 119 to: India Application No. 202121040117, filed on 3 Sep. 2021. The entire contents of the aforementioned application are incorporated herein by reference

Technical Field

The disclosure herein generally relates to soil carbon sequestration, and, more particularly, to a method and a system for assessing soil carbon sequestration of farm based on remote sensing.

BACKGROUND

Climate change and global warming are critical issues facing the world today. One of the driving factors for climate change and global warming is greenhouse gas emissions, wherein a greenhouse gas (GHG or GhG) is a gas that absorbs and emits radiant energy (heat) within the thermal infrared range, causing the greenhouse effect. The primary greenhouse gases in Earth's atmosphere are water vapor ($H_2O$), carbon dioxide ($CO_2$), methane ($CH_4$), nitrous oxide ($N_2O$), and ozone ($O_3$).

The greenhouse gases, especially carbon dioxide ($CO_2$), can be removed from the Earth's atmosphere by various processes including biological, chemical, and physical processes. Of the biological processes for removal of $CO_2$, agricultural fields can act as a carbon sink, wherein the carbon sink is a reservoir that accumulates and stores carbon-containing chemical compound for an indefinite period and thereby lowers the concentration of $CO_2$ from the atmosphere. The agricultural lands are excellent natural carbon sinks as they store $CO_2$ in biomass and soil, as a result of photosynthesis in crops. The process through which $CO_2$ from the atmosphere is absorbed naturally through photosynthesis & stored as carbon in biomass & soils is called soil carbon sequestration.

Agricultural practices can directly affect the $CO_2$ levels in the soil, hence it is recommended to follow agricultural practices that would aid in better absorption of $CO_2$ in the soil, which would also enable increased crop yield while also reducing the greenhouse gases in the atmosphere. Hence adoption of sustainable agricultural management practices enables efficient soil carbon sequestration thereby reducing the greenhouse gases as well as increasing the crop yield. Based on the adoption of sustainable agriculture management practices, the farm needs to be continuously monitored to assess the carbon levels to enable analysis of carbon sequestration at real time.

The existing legacy state of art techniques for monitoring carbon levels in agricultural farms focuses on crops and various practices followed by land attributes, however there is a need for estimation of carbon levels by accurate recommendation of sustainable agricultural practices by considering various environment factors and also constantly monitoring the farm at real time using modern technologies.

SUMMARY

Embodiments of the present disclosure present technological improvements as solutions to one or more of the above-mentioned technical problems recognized by the inventors in conventional systems. For example, in one embodiment, a method for assessing soil carbon sequestration of farm based on remote sensing is provided. The system includes a memory storing instructions, one or more communication interfaces, and one or more hardware processors coupled to the memory via the one or more communication interfaces, wherein the one or more hardware processors are configured by the instructions to receive a plurality of satellite data from a satellite, wherein the satellite data is obtained by remote sensing a land area and comprises a plurality of satellite images with corresponding geo co-ordinates, a carbon map, a plurality of agroclimatic zone for the plurality of satellite images, a biological yield, a Soil Organic Carbon Below Ground (SOC BG) and an Organic Carbon Above ground (OC AG). The system is further configured for receiving a plurality of farming data from a plurality of sources, wherein the plurality of farming data is associated with a farm in the land area and comprises the farm's location, the farm's geo-coordinates and a crowd sourcing data. The system is further configured for locating the farm in the plurality of satellite data using the plurality of farming data based on a location identification technique. The system is further configured for identifying an agroclimatic zone and a suitable crop for the farm using the plurality of satellite data, wherein the agro-climatic zone and the suitable crop are identified based on a Machine Learning (ML) technique. The system is further configured for estimating an initial Soil Organic Carbon (SOC) level for the farm using the plurality of satellite data, wherein the SOC level is estimated based on a carbon sequestration estimation technique. The system is further configured for recommending a set of agricultural practices for a crop life cycle of the suitable crop using a carbon smart crop protocol, wherein the carbon smart crop protocol is identified based on the agroclimatic zone and the SOC of the farm. The system is further configured for continuously monitoring the farm for the crop life cycle of the suitable crop using the plurality of satellite data and the plurality of farming data based on a remote sensing technique, wherein the remote sensing technique comprises estimating a crop health index and an adoption index. The system is further configured for assessing a soil carbon sequestration for the farm by computing a set of carbon sequestration parameters for the farm using the plurality of satellite data, the plurality of farming data, the agroclimatic zone, the initial SOC, the crop health index and the adoption index, wherein the set of carbon sequestration parameters comprises a final SOC, a carbon loss and a net carbon sequestration level.

In another aspect, a method for assessing soil carbon sequestration of farm based on remote sensing is provided. The method includes receiving a plurality of satellite data from a satellite, wherein the satellite data is obtained by remote sensing a land area and comprises a plurality of satellite images with corresponding geo co-ordinates, a carbon map, a plurality of agroclimatic zone for the plurality of satellite images, a biological yield, a Soil Organic Carbon Below Ground (SOC BG) and an Organic Carbon Above ground (OC AG). The method further includes receiving a plurality of farming data from a plurality of sources, wherein the plurality of farming data is associated with a farm in the land area and comprises the farm's location, the farm's geo-coordinates and a crowd sourcing data. The method further includes locating the farm in the plurality of satellite data using the plurality of farming data based on a location identification technique. The method further includes identifying an agroclimatic zone and a suitable crop for the farm using the plurality of satellite data, wherein the agroclimatic zone and the suitable crop are identified based on a Machine Learning (ML) technique. The method further includes estimating an initial Soil Organic Carbon (SOC) level for the farm using the plurality of satellite data, wherein the SOC level is estimated based on a carbon sequestration estimation technique. The method further includes recommending a set of agricultural practices for a crop life cycle of the suitable crop using a carbon smart crop protocol, wherein the carbon smart crop protocol is identified based on the agroclimatic zone and the SOC of the farm. The method further includes continuously monitoring the farm for the crop life cycle of the suitable crop using the plurality of satellite data and the plurality of farming data based on a remote sensing technique, wherein the remote sensing technique comprises estimating a crop health index and an adoption index. The method further includes assessing a soil carbon sequestration for the farm by computing a set of carbon sequestration parameters for the farm using the plurality of satellite data, the plurality of farming data, the agro-climatic zone, the initial SOC, the crop health index and the adoption index, wherein the set of carbon sequestration parameters comprises a final SOC, a carbon loss and a net carbon sequestration level.

In yet another aspect, a non-transitory computer readable medium for assessing soil carbon sequestration of farm based on remote sensing is provided. The program includes receiving a plurality of satellite data from a satellite, wherein the satellite data is obtained by remote sensing a land area and comprises a plurality of satellite images with corresponding geo co-ordinates, a carbon map, a plurality of agroclimatic zone for the plurality of satellite images, a biological yield, a Soil Organic Carbon Below Ground (SOC BG) and an Organic Carbon Above ground (OC AG). The program further includes receiving a plurality of farming data from a plurality of sources, wherein the plurality of farming data is associated with a farm in the land area and comprises the farm's location, the farm's geo-coordinates and a crowd sourcing data. The program further includes locating the farm in the plurality of satellite data using the plurality of farming data based on a location identification technique. The program further includes identifying an agroclimatic zone and a suitable crop for the farm using the plurality of satellite data, wherein the agroclimatic zone and the suitable crop are identified based on a Machine Learning (ML) technique. The program further includes estimating an initial Soil Organic Carbon (SOC) level for the farm using the plurality of satellite data, wherein the SOC level is estimated based on a carbon sequestration estimation technique. The program further includes recommending a set of agricultural practices for a crop life cycle of the suitable crop using a carbon smart crop protocol, wherein the carbon smart crop protocol is identified based on the agroclimatic zone and the SOC of the farm. The program further includes continuously monitoring the farm for the crop life cycle of the suitable crop using the plurality of satellite data and the plurality of farming data based on a remote sensing technique, wherein the remote sensing technique comprises estimating a crop health index and an adoption index. The program further includes assessing a soil carbon sequestration for the farm by computing a set of carbon sequestration parameters for the farm using the plurality of satellite data, the plurality of farming data, the agroclimatic zone, the initial SOC, the crop health index and the adoption index, wherein the set of carbon sequestration parameters comprises a final SOC, a carbon loss and a net carbon sequestration level.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
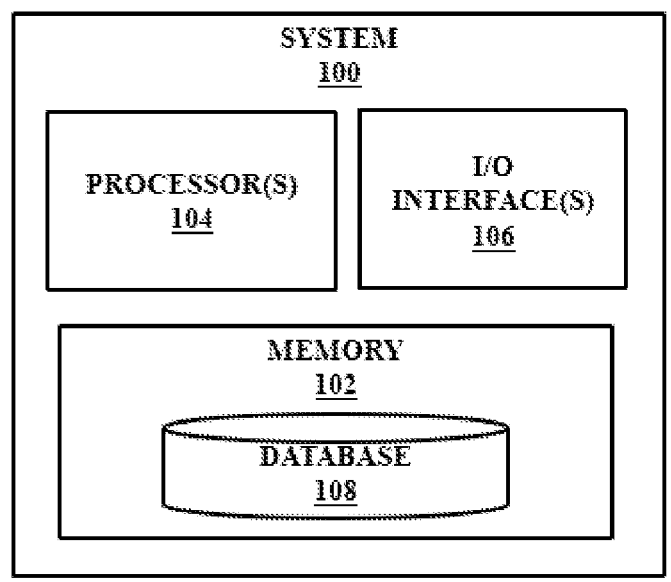
FIG. 1 illustrates an exemplary system for assessing soil carbon sequestration of farm based on remote sensing according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Referring now to the drawings, and more particularly to FIG. 1 through FIG. 3B, where similar reference characters denote corresponding features consistently throughout the figures, there are shown preferred embodiments and these embodiments are described in the context of the following exemplary system and/or method.

FIG. 1 is a functional block diagram of a system 100 for assessing soil carbon sequestration of farm based on remote sensing in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of the system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 is configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, a network cloud and the like.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 may include a database 108 configured to include information regarding historic farming data and historic satellite data. The memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106.

Figure 2:
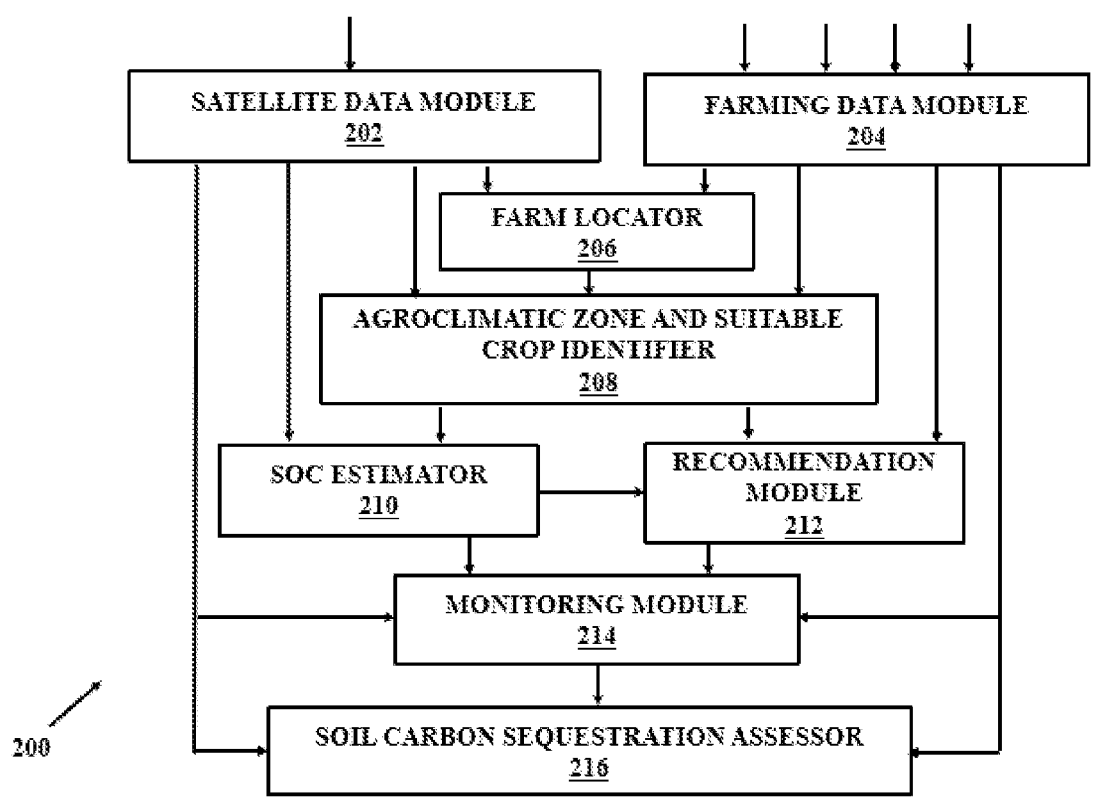
FIG. 2 is a functional block diagram of a system for assessing soil carbon sequestration of farm based on remote sensing according to some embodiments of the present disclosure.
Figure 3A:
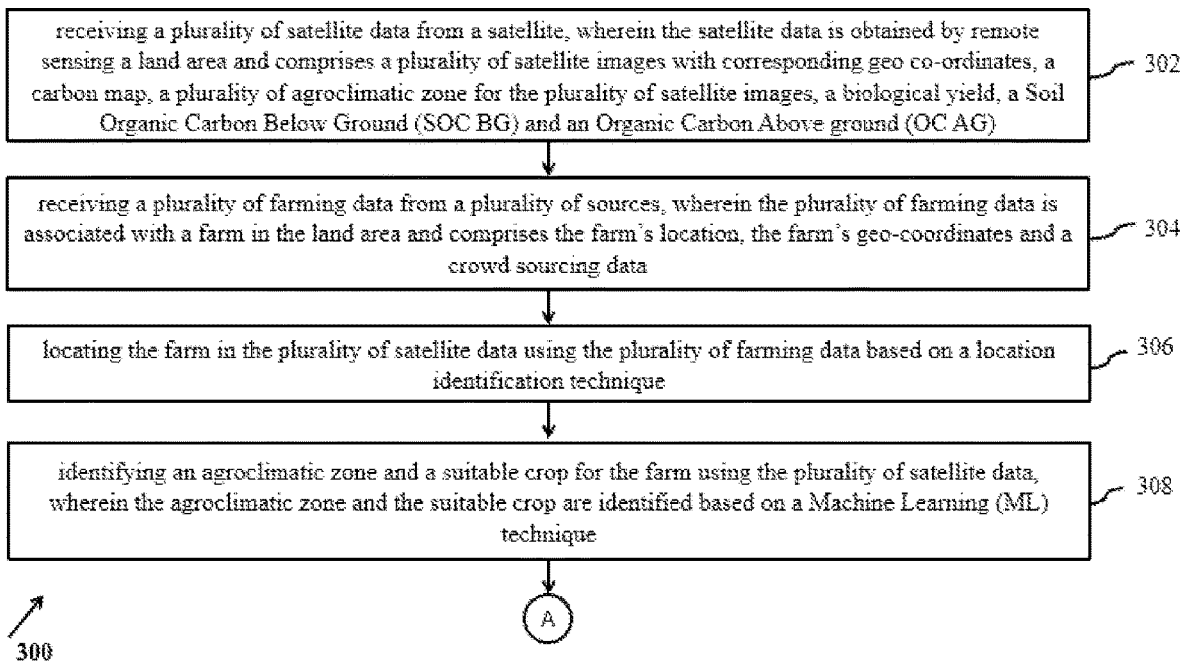
FIG. 3A and FIG. 3B is a flow diagram illustrating a method (300) for assessing soil carbon sequestration of farm based on remote sensing in accordance with some embodiments of the present disclosure.
Figure 3B:
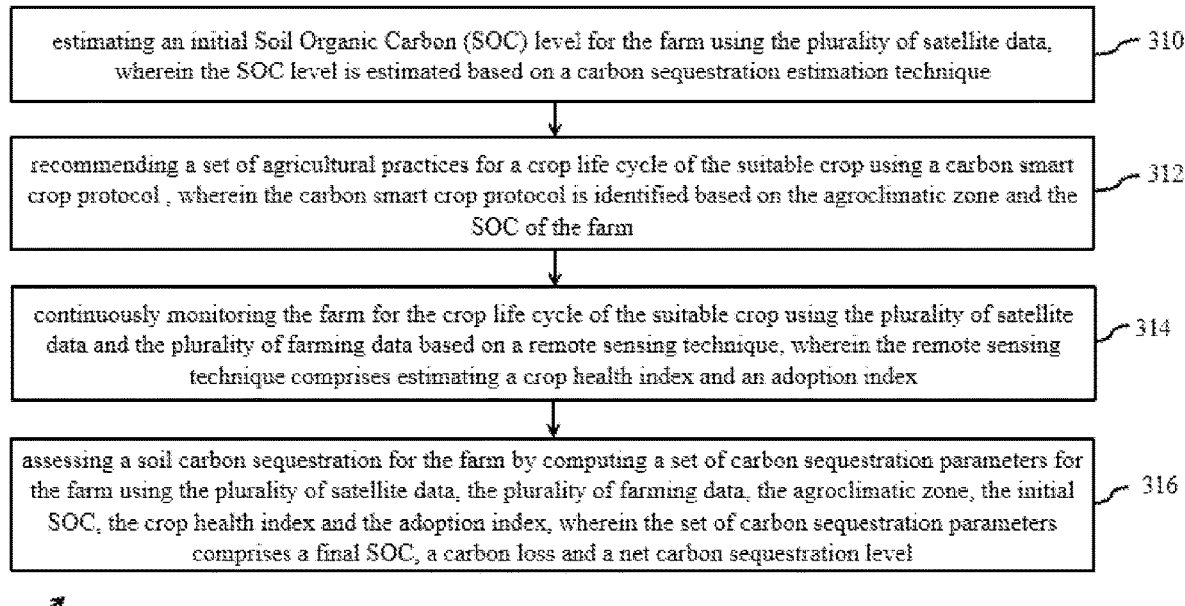

Functions of the components of system 100 are explained in conjunction with functional overview of the system 100 in FIG. 2 and flow diagram of FIGS. 3A and 3B for assessing soil carbon sequestration of farm based on remote sensing.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

FIG. 2 is an example functional block diagram of the various modules of the system of FIG. 1, in accordance with some embodiments of the present disclosure. As depicted in the architecture, the FIG. 2 illustrates the functions of the modules of the system 100 that includes assessing soil carbon sequestration of farm based on remote sensing.

The system 200 for assessing soil carbon sequestration of farm based on remote sensing is configured to receive a plurality of satellite data from a satellite, at a satellite data module 202, wherein the satellite data is obtained by remote sensing a land area. The plurality of satellite data comprises a plurality of satellite images with corresponding geo co-ordinates, a carbon map, a plurality of agroclimatic zone for the plurality of satellite images, a biological yield, a Soil Organic Carbon Below Ground (SOC BG) and an Organic Carbon Above ground (OC AG). The system 200 is also configured to receive a plurality of farming data from a plurality of sources at a farming data module 204, wherein the plurality of farming data is associated with a farm in the land area. The plurality of farming data comprises the farm's location, the farm's geo-coordinates and a crowd sourcing data.

The system 200 further comprises a farm locator 206 configured for locating the farm in the plurality of satellite data in using the plurality of farming data. The farm is located on the based in plurality of satellite data based on a location identification technique.

The system 200 further comprises an agroclimatic zone and suitable crop identifier 208 configured for identifying an agroclimatic zone and a suitable crop for the farm at using the plurality of satellite data. The agro-climatic zone and the suitable crop are identified based on a Machine Learning (ML) technique.

The system 200 further comprises a SOC Estimator 210 configured for estimating an initial Soil Organic Carbon (SOC) level for the farm at using the plurality of satellite data. The SOC level is estimated based on a carbon sequestration estimation technique The system 200 further comprises a recommendation module 212 configured for recommending a set of agricultural practices for a crop life cycle of the suitable crop using a carbon smart crop protocol. The carbon smart crop protocol is identified based on the agroclimatic zone and the SOC of the farm.

The system 200 further comprises a monitoring module 214 configured for continuously monitoring the farm for the crop life cycle of the suitable crop using the plurality of satellite data and the plurality of farming data. The farm is continuously monitoring based on a remote sensing technique, wherein the remote sensing technique comprises estimating a crop health index and an adoption index.

The system 200 further comprises a soil carbon sequestration assessor 216 configured for assessing a soil carbon sequestration for the farm by computing a set of carbon sequestration parameters for the farm using the plurality of satellite data, the plurality of farming data, the agroclimatic zone, the initial SOC, the crop health index and the adoption index. The set of carbon sequestration parameters comprises a final SOC, a carbon loss and a net carbon sequestration level.

The various modules of the system 100 and the functional blocks in FIG. 2 are configured for assessing soil carbon sequestration of farm based on remote sensing are implemented as at least one of a logically self-contained part of a software program, a self-contained hardware component, and/or, a self-contained hardware component with a logically self-contained part of a software program embedded into each of the hardware component that when executed perform the above method described herein.

Functions of the components of the system 200 are explained in conjunction with functional modules of the system 100 stored in the memory 102 and further explained in conjunction with flow diagram of FIG. 3A and FIG. 3B. The FIG. 3A and FIG. 3B with reference to FIG. 1, is an exemplary flow diagram illustrating a method 300 for assessing soil carbon sequestration of farm based on remote sensing using the system 100 of FIG. 1 according to an embodiment of the present disclosure.

The steps of the method of the present disclosure will now be explained with reference to the components of the system (100) for assessing soil carbon sequestration of farm based on remote sensing and the modules (202-216) as depicted in FIG. 2 and the flow diagrams as depicted in FIG. 3A and FIG. 3B. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method (300), a plurality of satellite data from a satellite is received at the satellite data module 202. The plurality of satellite data is obtained by remote sensing a land area. The plurality of satellite data comprises of a plurality of satellite images with corresponding geo co-ordinates, a carbon map, a plurality of agroclimatic zone for the plurality of satellite images, a biological yield, a Soil Organic Carbon Below Ground (SOC BG) and an Organic Carbon Above ground (OC AG).

In an embodiment, the plurality of satellite data is obtained by remote sensing a land area by a satellite. In an example scenario, the satellite includes Sentinel 2, Landsat 8, Moderate Resolution Imaging Spectroradiometer (MODIS). The obtained plurality of satellite data is pre-processed to obtain a time-series format of the plurality of satellite data. The pre-processing of the plurality of satellite data is performed using cloud free historical satellite data wherein the pre-processing techniques include temporal maximum, cloud flag layer data from the satellite data providers.

The Geo map obtained from satellite by remote sensing a land area is useful to understand the soil parameters and irrigation sources, historical yield potential of the area. The biological yield is a parameter associated with organic carbon present in grain yield and biomass yield of crops.

At step 304 of the method (300), a plurality of farming data from a plurality of sources is received at the farming data module 204. The plurality of farming data is associated with a farm in the land area and comprises the farm's location, the farm's geo-coordinates and a crowd sourcing data.

In an embodiment, the plurality of sources includes several farmers, wherein the farmers provide details of the farm's location and the farm's geo-coordinates. The farm's geo-coordinates include a latitude and a longitude of the farm. The crowd sourcing data is also collected from the farmers, wherein the crowd sourcing data comprises details of the farm that may be required for assessment of carbon sequestration such as agro-climatic zone and climatic details where the farm is located.

At step 306 of the method (300), the farm is located in the plurality of satellite data using the plurality of farming data at the farm locator 206. The farm is located in the plurality of satellite date based on a location identification technique.

In an embodiment, the location identification technique includes a satellite-based radio-navigation technology such as Global Positioning System (GPS).

At step 308 of the method (300), an agroclimatic zone and a suitable crop is identified for the farm using the plurality of satellite data at the agroclimatic zone and suitable crop identifier 208. The agroclimatic zone and the suitable crop are identified based on a Machine Learning (ML) technique.

In an embodiment, the agroclimatic zone and a suitable crop is identified for the farm using the plurality of satellite data based on ML techniques. The ML techniques include a Support Vector Machine (SVM), a deep neural network, a random forest.

An Argo-ecological zone is the land unit carved out of an Argo-climatic zone superimposed on a landform, that acts as modifier to climate and length of growing period, wherein the "Agro-climatic zone" is a land unit in terms of major climates, suitable for a certain range of crops and cultivars. The Agro-climatic conditions mainly refer to soil types, rainfall, temperature and water 20 availability which influence the type of vegetations.

The agricultural-climate characteristics includes parameters such as a crop that would produce good yield in the landform (suitable crop), a cropping intensity, a rainfall trend and a soil composition. The agro-climatic conditions include identification of time of start of the season, peak of the growing season and end of the growing season over a region. Further, a length of a season can be estimated from start and end of the season for a crop life cycle (from seeding till harvesting of the crop).

The Food and agriculture organization (FAO) of the government of India has defined the agro-climatic zone as a land unit represented accurately or precisely in terms of major climate and growing period, which is climatically suitable for certain range of crops and cultivars. In other words, the agro-climatic zones is an extension of the climate classification keeping in view the suitability to agriculture, wherein a exhaustive database is available to identify the agro-climatic zone of a location in India at FAO.

At step 310 of the method (300), an initial Soil Organic Carbon (SOC) level is estimated for the farm using the plurality of satellite data at the SOC Estimator 210. The SOC level is estimated based on a carbon sequestration estimation technique.

In an embodiment, the carbon sequestration estimation technique comprises of estimating the initial SOC, wherein the initial SOC is estimated at a beginning the crop life cycle of the suitable crop.

The initial SOC is estimated as a summation of the Soil Organic Carbon Below Ground (SOC BG) and the Organic Carbon Above ground (OC AG). The SOC BG and the OC AG are real-time values received from the plurality of satellite data at a particular time instant. The initial SOC is expressed as shown below:

$$SOC = SOC\ BG + OC\ AG \qquad (1)$$

At step 312 of the method (300), a set of agricultural practices is recommended for a crop life cycle of the suitable crop using a carbon smart crop protocol at the recommendation module 212. The carbon smart crop protocol is identified based on the agroclimatic zone and the SOC of the farm.

In an embodiment, the set of agricultural practices are best practices to be followed for effective crop production in farming during the crop life cycle of the suitable crop. The set of agricultural practices are also aligned to ensure effective carbon sequestration in the soil. The carbon smart crop protocol is identified based on the agroclimatic zone and the SOC of the farm and comprises of a set of tillage operations, a nutrient management, an irrigation management, a pest and disease management. Hence the carbon smart crop protocol is a personalized recommendation of the set of tillage operations, the nutrient management, the irrigation management, the pest and disease management for farming of each suitable crop and is identified based on the agroclimatic zone and the SOC of the farm to enable effective yield/growth of the suitable crop. The carbon smart crop protocol can be expressed as shown below:

$$\text{Carbon Smart crop Protocol} = \Sigma(Xt + Xnm + Xir + XP + Xd) \qquad (2)$$

Where
t=set of tillage operations
nm=Nutrient Management
ir=irrigation Management
p=pest management
d=disease management In an example scenario the recommendation of the set of agricultural practices includes (a) conservation tillage practices like direct seeding systems, (b) elimination of summer fallow, (c) extending crop rotations to include perennial forage crops for hay or pasture, (d) Management of crop residue and application of organic materials and manures; (e) Soil fertility optimization through improved fertilizer placement and site specific management, (f) Reductions in the use of chemicals, (g) Other techniques that may improve crop yields, and reduce on site and off site production risks.

At step 314 of the method (300), the farm is continuously monitored for the crop life cycle of the suitable crop using the plurality of satellite data and the plurality of farming data at the monitoring module 214. The farm is continuously monitoring based on a remote sensing technique, wherein the remote sensing technique comprises estimating a crop health index and an adoption index.

In an embodiment, the crop health index is an indicator of a health condition of the suitable crop. The crop health index estimated based on a Normalized Difference Vegetation Index (NDVI) technique. The NDVI is a common measure in remote sensing for agriculture wherein health condition of the suitable crop is estimated by capturing the reflection of near infrared light compared to visible red in the plurality if satellite data. The NDVI is utilized to differentiate between crops and crop stages to enable the analysis of health of the crop. Based on the crop health index (estimated suing NDVI) and a set of pre-determined threshold values, the health of the suitable crop is determined. An example scenario of the crop health index and comparison with the set of pre-determined threshold values is illustrated in the table below:

TABLE 1

Crop health index

| Set of threshold values for crop health index | Health condition of the suitable crop |
|---|---|
| 0– to 0.33 | Unhealthy plant |
| 0.33 to 0.66 | Moderately healthy plant |
| 0.66 to 1 | Very Healthy Plant |

In an embodiment, the adoption index is associated with the recommended set of agricultural practices. The Adoption index is the degree of actual use of Carbon Smart Crop Protocol by farmers. It will be measured on three-point continuum as full adoption, partial adoption and non-adoption by assigning the score of 2, 1 and 0, respectively. The adoption score was then converted into adoption index by applying following formula, $$\text{Adoption index} = \frac{\text{Obtained Adoption score}}{\text{Maximum Obtainable Adoption score}} \times 100 \qquad (3)$$

The Adoption index is directly proportional to the crop health index.

At step 316 of the method (300), a soil carbon sequestration is assessed for the farm at the soil carbon sequestration assessor 216 by computing a set of carbon sequestration parameters for the farm. The of carbon sequestration parameters are computed for the farm using the plurality of satellite data, the plurality of farming data, the agroclimatic zone, the initial SOC, the crop health index and the adoption index. The set of carbon sequestration parameters comprises a final SOC, a carbon loss and a net carbon sequestration level.

In an embodiment, the final SOC is estimated based on the carbon sequestration estimation technique. The final SOC is estimated at the end the crop life cycle of the suitable crop. The final SOC is estimated as a summation of the Soil Organic Carbon Below Ground (SOC BG) and the Organic Carbon Above ground (OC AG). The SOC BG and the OC AG are real-time values received from the plurality of satellite data at a particular time instant. The final SOC is expressed as shown below:

$$SOC = SOC\ BG + OC\ AG \qquad (4)$$

In an embodiment, the carbon loss (CL) is calculated based on crop health index and the biological yield obtained using the plurality of satellite data obtained based on remote sensing at the end of crop life cycle at the farm. The CL is computed using above ground SOC (AG SOC), below ground SOC (BG SOC) along with the organic carbon above ground loss (OC AG Loss), wherein the OC AG loss is 40% of dry matter of the biological yield (obtained from the plurality of satellite data). The CL is expressed as shown below:

$$CL = \Sigma(SOC(BG+AG)) - (\Sigma OC\ AG\ \text{Loss}) \qquad (5)$$

In an embodiment, the Net Carbon Sequestration level is computed based on a matrix. The matrix is pre-determined using the plurality of satellite data, the plurality of farming data, the agroclimatic zone, the initial SOC, the crop health index and the adoption index. An example scenario of the matrix is illustrated as shown below:

TABLE 2

Matrix for net Carbon sequester level

| Adoption Index | Range | Crop health Index | Initial SOC in tons/ha | BG SOC accumulation per season in tons/ha | AG SOC net accumulation/ season in tons/ha | Gross SOC accumulation/ season in tons/ha | Net OC AG Loss/season/ season in tons/ha | Net Carbon Sequestration accumulation in the farmland in tones/ha |
|---|---|---|---|---|---|---|---|---|
| Low | 25-50 | 0-0.33 | 0.80 | 3.55 | 0.0 | 4.35 | 3.20 | 1.15 |
| Medium | 50-70 | 0.33-0.66 | 0.80 | 3.55 | 1.20 | 5.55 | 1.64 | 3.91 |
| High | 75-100 | 0.66-1.00 | 0.80 | 3.55 | 3.20 | 7.55 | 0 | 7.55 |

The net Carbon sequester level measured using the above matrix (Table 2) and is classified in to three categories as per the process and enables the assessment of the amount of carbon sequestered in the soil during the cropping season.

The set of carbon sequestration parameters that the final SOC, the carbon loss and the net carbon sequestration level is displayed on the I/O interface(s) 106. Thus by remotely monitoring the farm and assessing carbon sequestration of the farm land the frequent visits to the farm for assessment will be greatly reduced while also providing an accurate and effective technique to also increase the carbon levels in soil (by recommending the set of agricultural practices).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address an unresolved problem of assessing carbon sequestration in a farm using remote sensing at real time. This disclosure relates generally to assessing soil carbon sequestration. One of the driving factors for climate change and global warming is emission of greenhouse gas emissions. Of the possible ways to reduce climate change and global warming adoption, sustainable agricultural practices will enable efficient soil carbon sequestration thereby reducing the greenhouse gases as well as increasing the crop yield. The disclosure is a method and a system for real time assessing soil carbon sequestration of farm based on remote sensing. The soil carbon sequestration of farm is assessed by continuously monitoring the farm at real time based on remote sensing using a plurality of satellite data and a plurality of farming data using several techniques. The several techniques utilized for assessing soil carbon sequestration includes machine learning, a carbon sequestration estimation technique, estimating a crop health index and an adoption index and computing a set of carbon sequestration parameters.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method assessing soil carbon sequestration of farming based on remote sensing comprising:

receiving a plurality of satellite data from a satellite, via a one or more hardware processor, wherein the satellite data is obtained by remote sensing a land area and comprises a plurality of satellite images with corresponding geo co-ordinates, a carbon map, a plurality of agroclimatic zone for the plurality of satellite images, a biological yield, a Soil Organic Carbon Below Ground (SOC BG) and an Organic Carbon Above ground (OC AG), and wherein the SOC BG and the OC AG are real-time values received from the plurality of satellite data at a particular time instant;

receiving a plurality of farming data from a plurality of sources, via the one or more hardware processor, wherein the plurality of farming data is associated with a farm in the land area and comprises the farm's location, the farm's geo-coordinates and a crowd sourcing data;

locating the farm in the plurality of satellite data using the plurality of farming data, via the one or more hardware processor, based on a location identification technique;

identifying an agroclimatic zone and a suitable crop for the farm using the plurality of satellite data, via the one or more hardware processor, wherein the agroclimatic zone and the suitable crop are identified based on a Machine Learning (ML) technique;

estimating an initial Soil Organic Carbon (SOC) level for the farm using the plurality of satellite data, via the one or more hardware processor, wherein the SOC level is estimated based on a carbon sequestration estimation technique;

recommending a set of agricultural practices for a crop life cycle of the suitable crop using a carbon smart crop protocol, via the one or more hardware processor, wherein the carbon smart crop protocol is identified based on the agroclimatic zone and the SOC of the farm, wherein the recommended set of agricultural practices are aligned to ensure effective carbon sequestration in the soil and increase carbon levels in the soil, and wherein the carbon smart crop protocol is a personalized recommendation of a set of tillage operations, a nutrient management, an irrigation management, a pest and disease management for farming of the suitable crop;

continuously monitoring the farm at real time for the crop life cycle of the suitable crop using the plurality of satellite data and the plurality of farming data based on a remote sensing technique, via the one or more hardware processor, wherein the remote sensing technique comprises estimating a crop health index and an adoption index, wherein the crop health index is an indicator of a health condition of the suitable crop and the adoption index is associated with the recommended set of agricultural practices, wherein the health condition of the suitable crop is determined based on the crop health index and a set of pre-determined threshold values, wherein adoption is a degree of actual use of the carbon smart crop protocol by farmers and measured on three-point continuum including a full adoption, a partial adoption and a non-adoption by assigning a score of 2, 1 and 0, and wherein the adoption index is directly proportional to the crop health index;

assessing a soil carbon sequestration for the farm at real time by computing a set of carbon sequestration parameters for the farm using the plurality of satellite data, the plurality of farming data, the agro-climatic zone, the initial SOC, the crop health index and the adoption index, via the one or more hardware processor, wherein the set of carbon sequestration parameters comprises a final SOC, a carbon loss and a net carbon sequestration level; and displaying the set of carbon sequestration parameters on an input/output (I/O) interface for remotely monitoring the farm.

2. The method of claim 1, wherein the carbon sequestration estimation technique comprises estimating the initial SOC and the final SOC, wherein the initial SOC is estimated at a beginning of the crop life cycle of the suitable crop and the final SOC is estimated at an end of the crop life cycle of the suitable crop.

3. The method of claim 2, wherein the initial SOC and the final SOC are estimated as a summation of the Soil Organic Carbon Below Ground (SOC BG) and the Organic Carbon Above ground (OC AG).

4. The method of claim 1, wherein the set of agricultural practices are best practices to be followed for effective crop production in farming during the crop life cycle of the suitable crop.

5. The method of claim 1, wherein the carbon loss is computed using the total SOC, the SOC BG and the OC AG.

6. The method of claim 1, wherein the net carbon sequestration level is computed based on a matrix pre-determined using the biological yield, the SOC, the crop health index and the adaptive index, the total SOC, the SOC BG, the OC AG and the carbon loss, and wherein the net carbon sequestration level measured using the matrix is classified into three categories as per a process and enables an assessment of an amount of carbon sequestered in the soil during a cropping season.

7. The method of claim 1, wherein the received plurality of satellite data is pre-processed to obtain a time-series format of the plurality of satellite data, wherein the pre-processing of the plurality of satellite data is performed using cloud free historical satellite data.

8. The method of claim 1, wherein the recommendation of the set of agricultural practices includes (a) conservation tillage practices including direct seeding systems, (b) elimination of summer fallow, (c) extending crop rotations to include perennial forage crops for hay or pasture, (d) management of crop residue and application of organic materials and manures, (e) soil fertility optimization through improved fertilizer placement and site specific management, (f) reductions in the use of chemicals, (g) techniques that improve crop yields, and reduce on site and off site production risks.

9. A system, comprising:
a memory storing instructions;
one or more communication interfaces; and
one or more hardware processors coupled to the memory via the one or more communication interfaces, wherein the one or more hardware processors are configured by the instructions to:

receive a plurality of satellite data from a satellite, via a one or more hardware processor, wherein the satellite data is obtained by remote sensing a land area and comprises a plurality of satellite images with corresponding geo co-ordinates, a carbon map, a plurality of agroclimatic zone for the plurality of satellite images, a biological yield, a Soil Organic Carbon Below Ground (SOC BG) and an Organic Carbon Above ground (OC AG), and wherein the SOC BG and the OC AG are real-time values received from the plurality of satellite data at a particular time instant;

receive a plurality of farming data from a plurality of sources, via the one or more hardware processor, wherein the plurality of farming data is associated with a farm in the land area and comprises the farm's location, the farm's geo-coordinates and a crowd sourcing data;

locate the farm in the plurality of satellite data using the plurality of farming data, via the one or more hardware processor, based on a location identification technique;

identify an agroclimatic zone and a suitable crop for the farm using the plurality of satellite data, via the one or more hardware processor, wherein the agroclimatic zone and the suitable crop are identified based on a Machine Learning (ML) technique;

estimate an initial Soil Organic Carbon (SOC) level for the farm using the plurality of satellite data, via the one or more hardware processor, wherein the SOC level is estimated based on a carbon sequestration estimation technique;

recommend a set of agricultural practices for a crop life cycle of the suitable crop using a carbon smart crop protocol, via the one or more hardware processor, wherein the carbon smart crop protocol is identified based on the agroclimatic zone and the SOC of the farm, wherein the recommended set of agricultural practices are aligned to ensure effective carbon sequestration in the soil and increase carbon levels in the soil, and wherein the carbon smart crop protocol is a personalized recommendation of a set of tillage operations, a nutrient management, an irrigation management, a pest and disease management for farming of the suitable crop;

continuously monitor the farm at real time for the crop life cycle of the suitable crop using the plurality of satellite data and the plurality of farming data based on a remote sensing technique, via the one or more hardware processor, wherein the remote sensing technique comprises estimating a crop health index and an adoption index, wherein the crop health index is an indicator of a health condition of the suitable crop and the adoption index is associated with the recommended set of agricultural practices, wherein the health condition of the suitable crop is determined based on the crop health index and a set of pre-determined threshold values, wherein adoption is a degree of actual use of the carbon smart crop protocol by farmers and measured on three-point continuum including a full adoption, a partial adoption and a non-adoption by assigning a score of 2, 1 and 0, and wherein the adoption index is directly proportional to the crop health index;

assess a soil carbon sequestration for the farm at real time by computing a set of carbon sequestration parameters for the farm using the plurality of satellite data, the plurality of farming data, the agroclimatic zone, the initial SOC, the crop health index and the adoption index, via the one or more hardware processor, wherein the set of carbon sequestration parameters comprises a final SOC, a carbon loss and a net carbon sequestration level; and display the set of carbon sequestration parameters on an input/output (I/O) interface for remotely monitoring the farm.

10. The system of claim 9, wherein the one or more hardware processors are configured by the instructions to perform the carbon sequestration estimation technique comprising estimation of the initial SOC and the final SOC, wherein the initial SOC is estimated at a beginning of the crop life cycle of the suitable crop and the final SOC is estimated at an end of the crop life cycle of the suitable crop.

11. The system of claim 10, wherein the one or more hardware processors are configured by the instructions to estimate the initial SOC and the final SOC as a summation of the Soil Organic Carbon Below Ground (SOC BG) and the Organic Carbon Above ground (OC AG).

12. The system of claim 9, wherein the one or more hardware processors are configured by the instructions to compute the carbon loss using the total SOC, the SOC BG and the OC AG.

13. The system of claim 9, wherein the one or more hardware processors are configured by the instructions to compute the net carbon sequestration level based on a matrix pre-determined using the biological yield, the SOC, the crop health index and the adaptive index, the total SOC, the SOC BG, the OC AG and the carbon loss, and wherein the net carbon sequestration level measured using the matrix is classified into three categories as per a process and enables an assessment of an amount of carbon sequestered in the soil during a cropping season.

14. One or more non-transitory machine-readable information storage mediums comprising one or more instructions which when executed by one or more hardware processors causes a method for assessing soil carbon sequestration of farming based on remote sensing thereof by:

receiving a plurality of satellite data from a satellite, wherein the satellite data is obtained by remote sensing a land area and comprises a plurality of satellite images with corresponding geo co-ordinates, a carbon map, a plurality of agroclimatic zone for the plurality of satellite images, a biological yield, a Soil Organic Carbon Below Ground (SOC BG) and an Organic Carbon Above ground (OC AG), and wherein the SOC BG and the OC AG are real-time values received from the plurality of satellite data at a particular time instant;

receiving a plurality of satellite data from a satellite, via a one or more hardware processor, wherein the satellite data is obtained by remote sensing a land area and comprises a plurality of satellite images with corresponding geo co-ordinates, a carbon map, a plurality of agroclimatic zone for the plurality of satellite images, a biological yield, a Soil Organic Carbon Below Ground (SOC BG) and an Organic Carbon Above ground (OC AG);

receiving a plurality of farming data from a plurality of sources, via the one or more hardware processor, wherein the plurality of farming data is associated with a farm in the land area and comprises the farm's location, the farm's geo-coordinates and a crowd sourcing data;

locating the farm in the plurality of satellite data using the plurality of farming data, via the one or more hardware processor, based on a location identification technique;

identifying an agroclimatic zone and a suitable crop for the farm using the plurality of satellite data, via the one or more hardware processor, wherein the agroclimatic zone and the suitable crop are identified based on a Machine Learning (ML) technique;

estimating an initial Soil Organic Carbon (SOC) level for the farm using the plurality of satellite data, via the one or more hardware processor, wherein the SOC level is estimated based on a carbon sequestration estimation technique;

recommending a set of agricultural practices for a crop life cycle of the suitable crop using a carbon smart crop protocol, via the one or more hardware processor, wherein the carbon smart crop protocol is identified based on the agroclimatic zone and the SOC of the farm, wherein the recommended set of agricultural practices are aligned to ensure effective carbon sequestration in the soil and increase carbon levels in the soil, and wherein the carbon smart crop protocol is a personalized recommendation of a set of tillage operations, a nutrient management, an irrigation management, a pest and disease management for farming of the suitable crop;

continuously monitoring the farm at real time for the crop life cycle of the suitable crop using the plurality of satellite data and the plurality of farming data based on a remote sensing technique, via the one or more hardware processor, wherein the remote sensing technique comprises estimating a crop health index and an adoption index, wherein the crop health index is an indicator of a health condition of the suitable crop and the adoption index is associated with the recommended set of agricultural practices, wherein the health condition of the suitable crop is determined based on the crop health index and a set of pre-determined threshold values, wherein adoption is a degree of actual use of the carbon smart crop protocol by farmers and measured on three-point continuum including a full adoption, a partial adoption and a non-adoption by assigning a score of 2, 1 and 0, and wherein the adoption index is directly proportional to the crop health index;

assessing a soil carbon sequestration for the farm at real time by computing a set of carbon sequestration parameters for the farm using the plurality of satellite data, the plurality of farming data, the agroclimatic zone, the initial SOC, the crop health index and the adoption index, via the one or more hardware processor, wherein the set of carbon sequestration parameters comprises a final SOC, a carbon loss and a net carbon sequestration level; and displaying the set of carbon sequestration parameters on an input/output (I/O) interface for remotely monitoring the farm.

\* \* \* \* \*